United States Patent
Huss et al.

(10) Patent No.: US 12,155,592 B2
(45) Date of Patent: Nov. 26, 2024

(54) COLLISION MANAGEMENT OF LTE NR REFERENCE SIGNALS

(71) Applicant: TELEFONAKTIEBOLAGET LM ERICSSON (PUBL), Stockholm (SE)

(72) Inventors: Fredrik Huss, Sundbyberg (SE); Franz Heiser, Järfälla (SE); Gary Boudreau, Kanata (CA); Luke Williams, Scarborough (CA); Robert Baldemair, Solna (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 500 days.

(21) Appl. No.: 17/435,813

(22) PCT Filed: Mar. 30, 2020

(86) PCT No.: PCT/IB2020/053029
§ 371 (c)(1),
(2) Date: Sep. 2, 2021

(87) PCT Pub. No.: WO2020/201996
PCT Pub. Date: Oct. 8, 2020

(65) Prior Publication Data
US 2022/0103321 A1  Mar. 31, 2022

Related U.S. Application Data

(60) Provisional application No. 62/826,295, filed on Mar. 29, 2019.

(51) Int. Cl.
*H04L 5/00* (2006.01)
(52) U.S. Cl.
CPC ................. *H04L 5/0048* (2013.01)

(58) Field of Classification Search
CPC ...................................................... H04L 5/0048
(Continued)

(56) References Cited

U.S. PATENT DOCUMENTS

| 9,385,819 | B2 | 7/2016 | Yoshimoto |
| 2013/0208587 | A1 | 8/2013 | Bala |
| 2015/0263839 | A1 | 9/2015 | He et al. |

FOREIGN PATENT DOCUMENTS

| CN | 104247488 A1 | 10/2018 |
| EP | 3382926 A1 | 1/2020 |

(Continued)

OTHER PUBLICATIONS

Office Action and Search Report dated May 12, 2022, TW Patent Application No. 110122060; Taiwan Intellectual Property Office.
(Continued)

*Primary Examiner* — Angel T Brockman
(74) *Attorney, Agent, or Firm* — Ericsson Inc.

(57) ABSTRACT

Embodiments of methods in a base station and a UE are disclosed. In some embodiments, a method implemented in a network node includes any one or more of: selectively puncturing transmission of LTE CRS symbols that overlap NR DMRS symbols in a downlink transmission time interval; selectively puncturing transmission of NR DMRS symbols that overlap LTE CRS symbols in the downlink transmission time interval; and selectively reducing a number of NR DMRS symbols transmitted to the UE in the downlink transmission time interval. In some embodiments, a method implemented in a UE includes identifying, in a downlink channel, subchannels containing NR DMRS symbols that are corrupted due to collision with LTE CRS symbols. For each identified subchannel: a respective time averaged channel estimate is determined based on NR DMRS symbols that are not corrupted due to collision with the LTE CRS
(Continued)

symbols; and a respective MMSE weight is determined using the time averaged channel estimate.

6 Claims, 11 Drawing Sheets

(58) Field of Classification Search
USPC .......................................................... 370/329
See application file for complete search history.

(56) References Cited

FOREIGN PATENT DOCUMENTS

| TW | 201904217 A | 1/2019 |
|----|-------------|--------|
| WO | 2018143746 A1 | 8/2018 |

OTHER PUBLICATIONS

ZTE et al: "Study on PDSCH transmission in shortened TTI", 3GPP draft; R1-164642; vol. RAN WG1 No. Nanjing, China; May 23, 2016; May 14, 2016; Retrieved from the Internet: URL: http://www.3gpp.org/ftp/tsg_ran/WG!_RL1/TSGR1_85/Docs/.

"Ericsson, "NR/LTE co-existence—Downlink", 3GPP TSG-RAN WG1 meeting #88, R1-1703026, Athens, Greece, Feb. 13-17, 2017."

Huawei, Hisilicon, "Coexistence of NR DL and LTE", 3GPP TSG RAN WG1 Meeting #88, R1-1703559, Athens, Greece, Feb. 13-17, 2017.

"Samsung, ""LTE-NR Coexistence for DL"", 3GPP TSG RAN WG1 #88, R1-1703010Athens, Greece, Feb. 13-17, 2017."

"Huawei, Hisilicon, ""Consideration of NR Signals and Channels Mapping Around LTE CRS"", 3GPP TSG RAN WG1 NR Ad-Hoc Meeting, R1-1700402 Spokane, USA, Jan. 16-20, 2017."

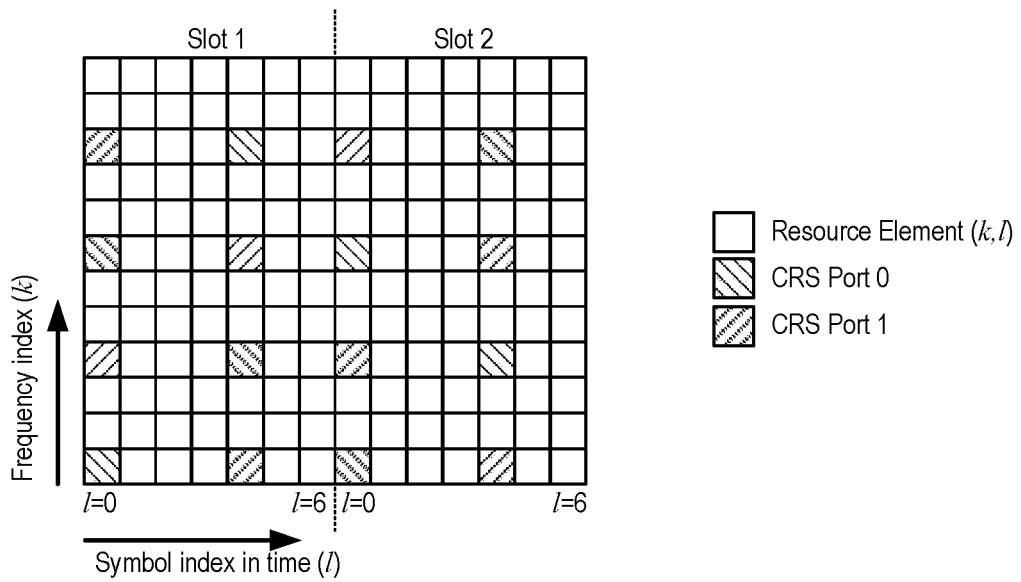
FIGURE 4
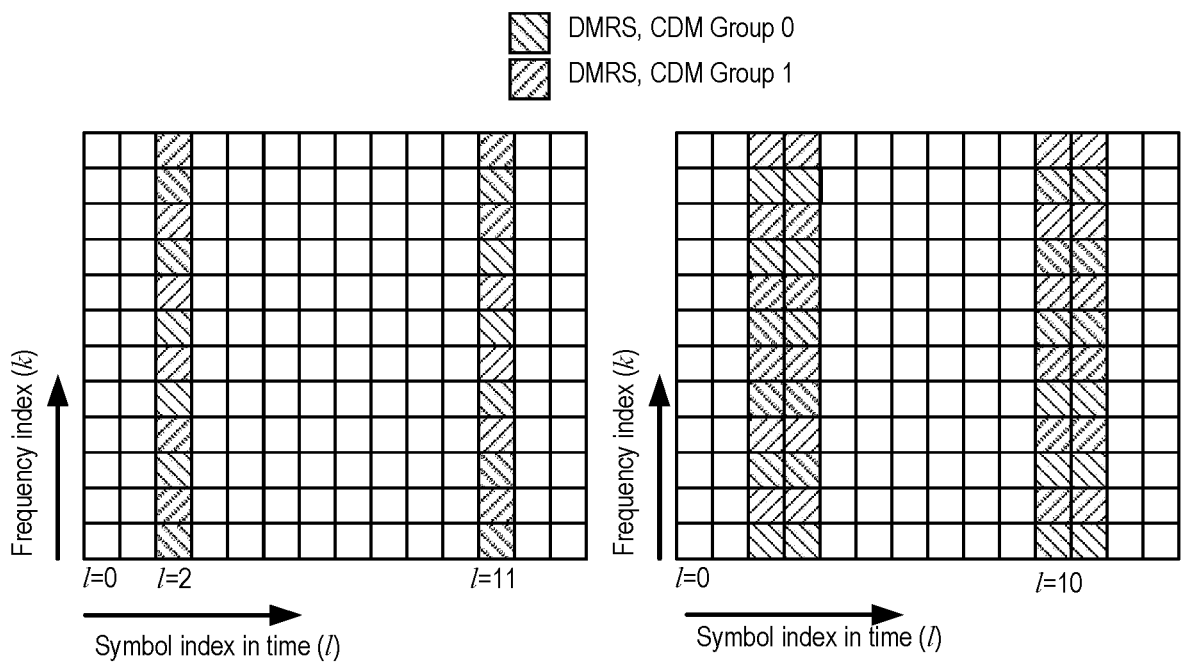
FIGURE 5A                    FIGURE 5B

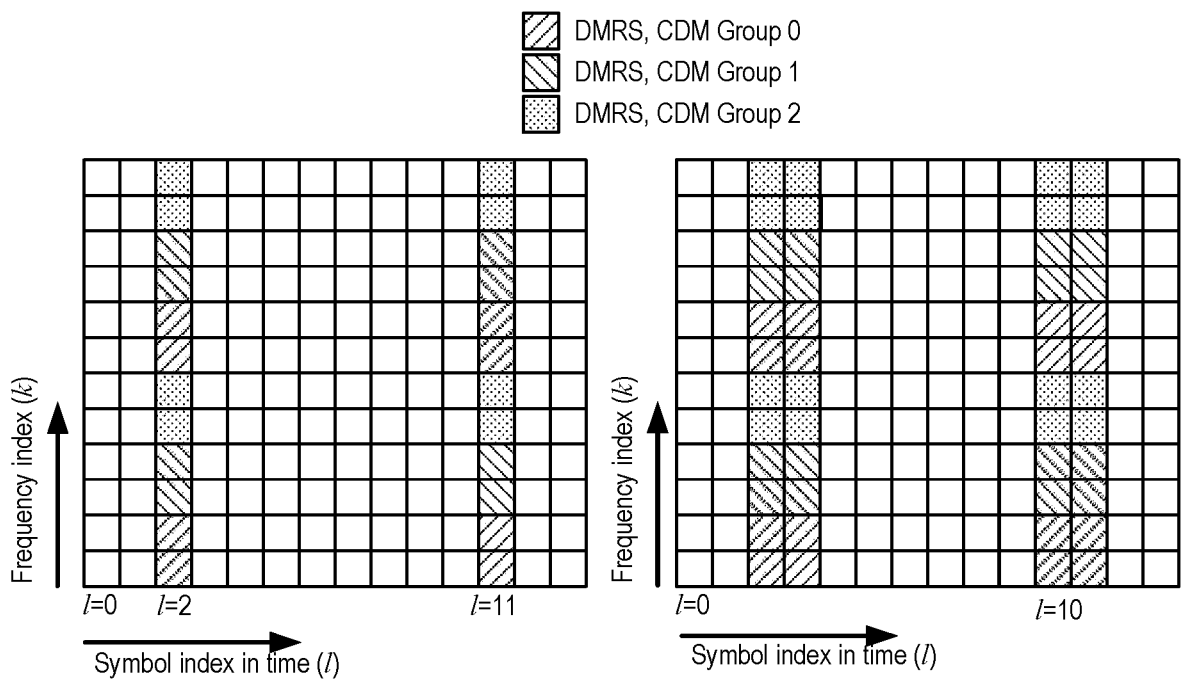
FIGURE 6A  FIGURE 6B

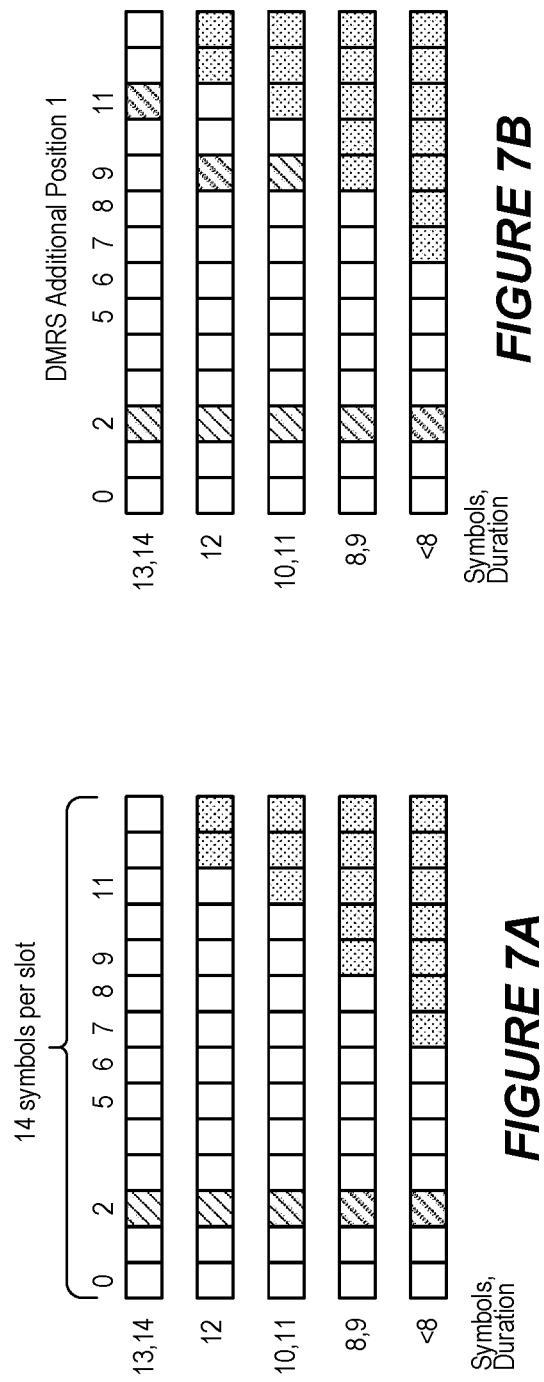
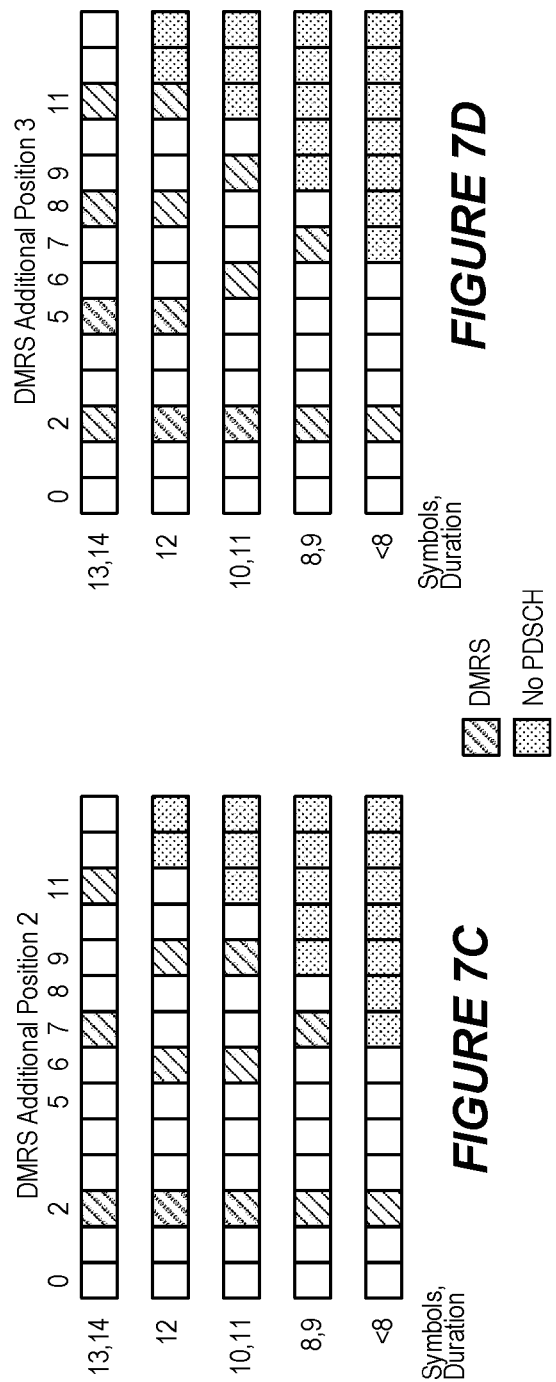
FIGURE 7A
FIGURE 7B
FIGURE 7C
FIGURE 7D

;

COLLISION MANAGEMENT OF LTE NR REFERENCE SIGNALS

TECHNICAL FIELD

The present disclosure relates to radio access networks, and in particular to management of collisions between LTE and NR reference signals.

BACKGROUND

The Third Generation Partnership Project (3GPP) has defined various standards governing signal formats for Long Term Evolution (LTE) and New Radio (NR) radio access technologies. Spectrum coexistence provides the possibility for an operator to deploy NR in the same spectrum as an already existing LTE deployment. This enables early NR deployment in the lower frequency spectrum without reducing the amount of spectrum available to LTE. This is relevant in both uplink and downlink and for both paired and unpaired spectrum. LTE and NR spectrum coexistence is possible when the time and frequency resource grids are identical for both NR and LTE. This can happen for an LTE-compatible NR numerology based on 15-kHz subcarrier spacing, for example.

However, both LTE and NR rely on reference signals to enable radio link optimization. When the time and frequency resource grids are identical for both NR and LTE, the respective reference signals can collide with the result that the performance of either one or both of the NR and LTE is degraded.

SUMMARY

An object of the present invention is to provide systems and methods that enable LTE and NR coexistence that overcomes at least some of the above-noted problems in the prior art.

Accordingly, aspects of the present invention provide a method implemented in a network node. The method includes any one or more of: selectively puncturing transmission of LTE common reference signal (CRS) symbols that overlap NR demodulation reference signal (DMRS) symbols in a downlink transmission time interval; selectively puncturing transmission of NR DMRS symbols that overlap LTE CRS symbols in the downlink transmission time interval; and selectively reducing a number of NR DMRS symbols transmitted to the UE in the downlink transmission time interval.

Other aspects of the present invention provide a method implemented in a UE. The method includes identifying, in a downlink channel, subchannels containing NR DMRS symbols that are corrupted due to collision with LTE CRS symbols. For each identified subchannel: a respective time averaged channel estimate is determined based on NR DMRS symbols that are not corrupted due to collision with the LTE CRS symbols; and a respective MMSE weight is determining using the time averaged channel estimate.

Advantages of the present invention include enabling LTE/NR spectrum coexistence with reduced (compared to conventional techniques) degradation of performance due to collisions between LTE CRS and NR DMRS signals.

Embodiments of a base station, communication system, and a method in a communication system are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

FIG. 4 illustrates mapping of downlink cell-specific common reference signals (CRS) for 2 antenna ports for LTE (normal cyclic prefix) for physical cell ID $N_{ID}^{cell}$=0, 3, 6, . . . ;

FIGS. 5A and 5B illustrate NR DMRS, Configuration type 1, mapping A for Single symbol (FIG. 5A) and double symbol (FIG. 5B);

FIGS. 6A and 6B illustrate NR DMRS, Configuration type 2, mapping A for single symbol (FIG. 6A) and double symbol (FIG. 6B);

FIGS. 7A-7D illustrate time-domain locations of NR DMRS for various symbol durations and additional DMRS positions in type A mapping;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 1:
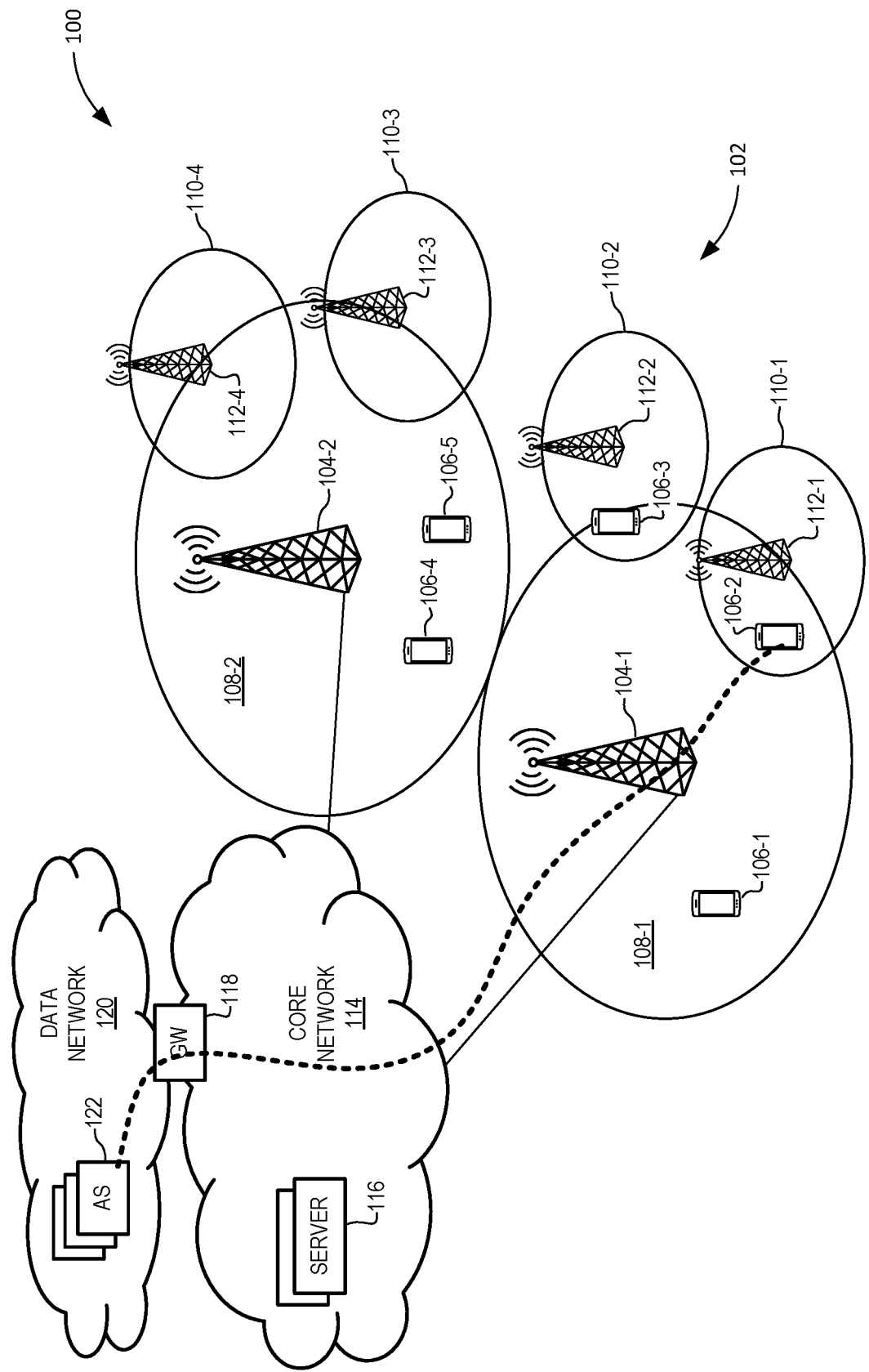
FIG. 1 is a block diagram schematically illustrating a representative network in which embodiments of the present invention may be deployed.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4, 106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: NR base station (gNB) systems and Evolved Node B (eNB) systems (both known, for example, in the 3GPP standards): WiFi access points (known, for example from IEEE 802.11 standards) or the like. In some contexts, a base station 104 may be referred to as an access point (AP) regardless of the Radio Access Technology (RAT) that it supports.

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WiFi access points or the like. In some contexts, a low power node 112 may be referred to as an access point (AP) regardless of the specific Radio Access Technology (RAT) that it supports.

Notably, while not illustrated, a particular small cell 110 may alternatively be controlled by a base station 104, for example using a beam-forming technique. In such cases, the particular small cell 110 will not be associated with a respective low power node 112 per se. Rather, the particular small cell 110 will be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018-June) "System Architecture for the 5G System" and its successors. The CN 114 also includes one or more gateway (GVV) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers (as) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
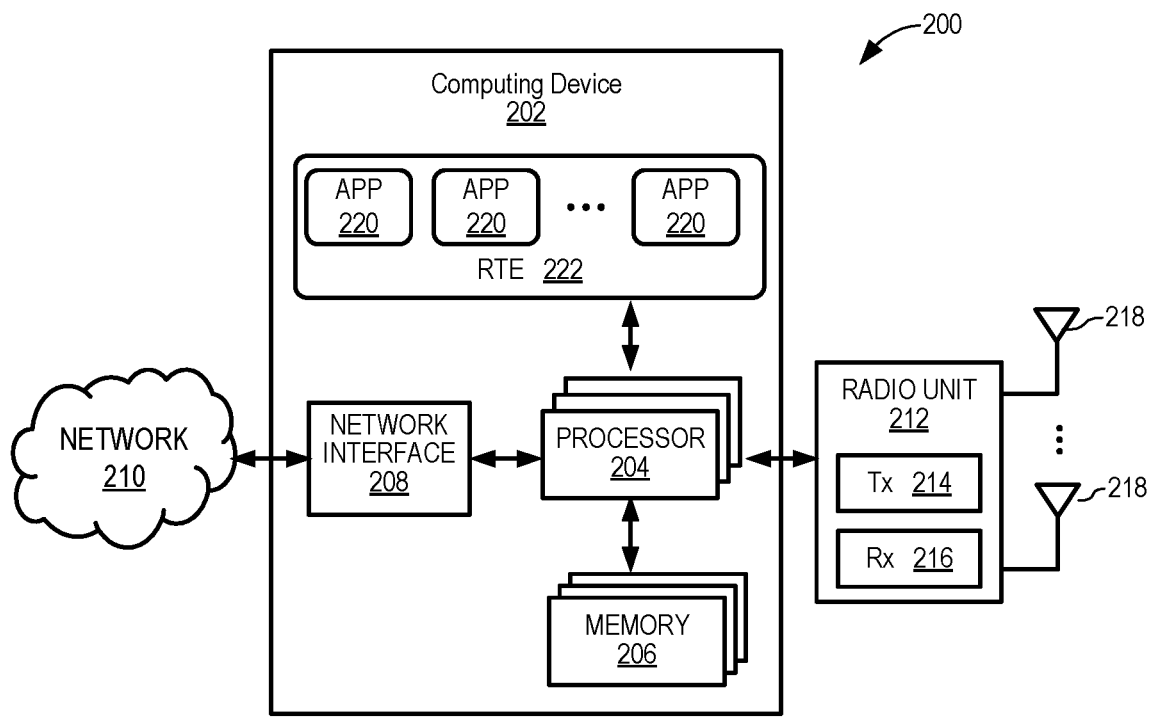
FIGS. 2A and 2B are block diagrams schematically illustrating examples of a computing device usable in embodiments of the present invention.
Figure 2B:
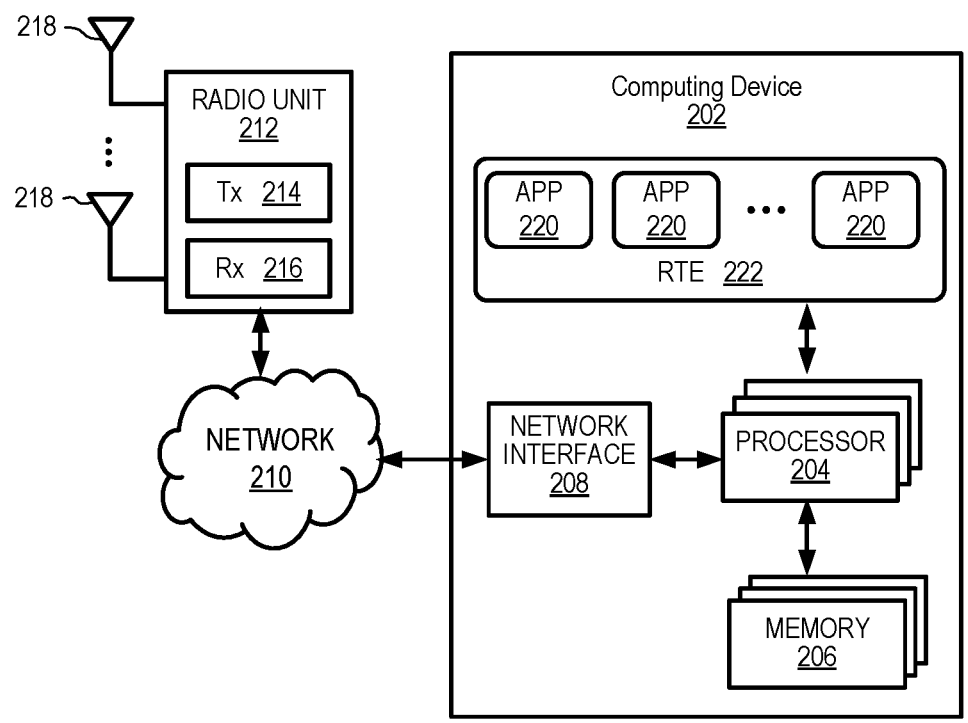

FIGS. 2A and 2B are block diagrams schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118, and/or any or all of the network functions may be implemented by suitable software executing within a computing device 202 or within a data center (non shown) composed of multiple computing devices 202.

In the example of FIG. 2A, the communications system 200 generally includes computing device 202 connected to one or more networks 210 and one or more radio units 212. The computing device 202 includes one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate one or more processors 204, a memory 206, and one or more radio units 212, but may exclude a network interface 208. Conversely, a computing device 202 configured to implement a server 116 or 122 may include one or more processors 204, a memory 206, and one or more network interfaces 208, but may exclude radio units 212. A computing device 202 configured to implement a base station 104 or 112, on the other hand, will normally include one or more processors 204, a memory 206, and both radio units 212 and network interfaces 208.

Figure 3:
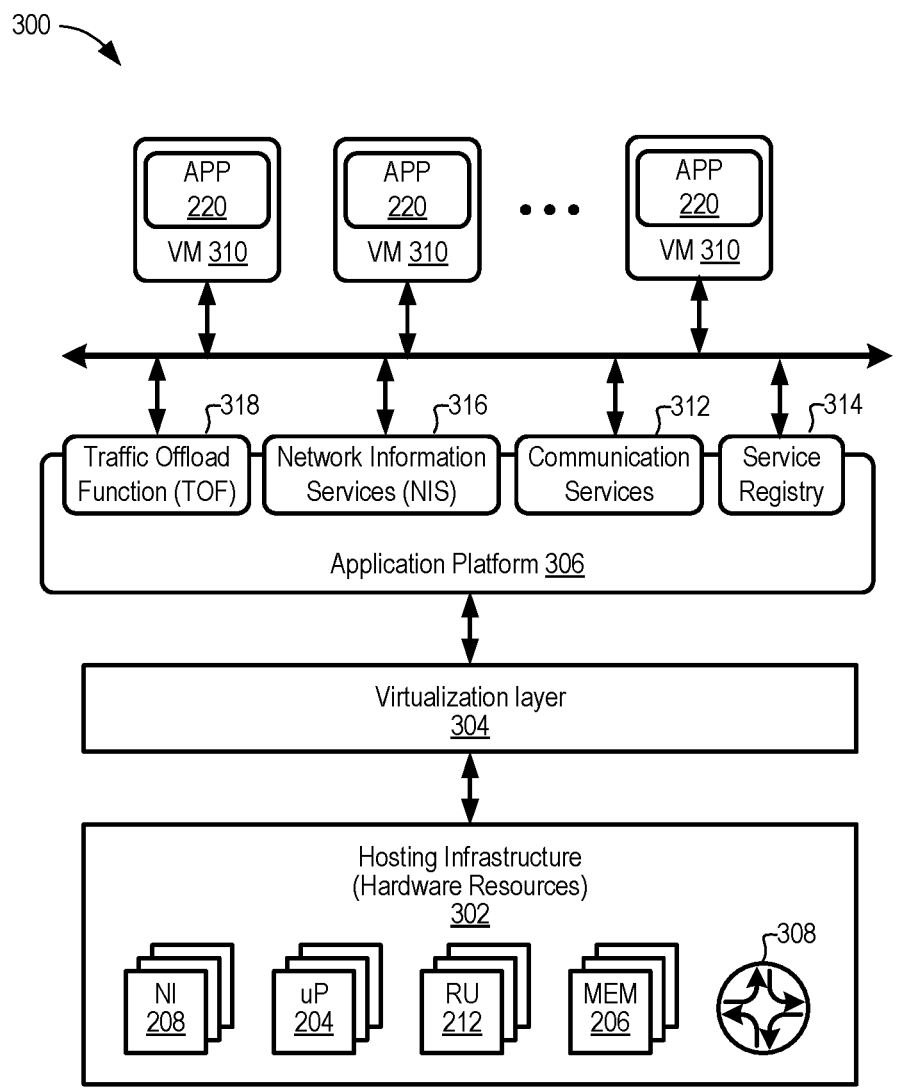
FIG. 3 is a block diagram schematically illustrating an architecture of a representative network element virtualization usable in embodiments of the present invention.

FIG. 3 is a block diagram schematically illustrating an example architecture for network element virtualization usable in embodiments of the present invention. It is contemplated that the network elements may be physically implemented using one or more computers, data storage devices and routers (any or all of which may be constructed in accordance with the system 200 described above with reference to FIGS. 2A and 2B) interconnected together and executing suitable software to perform its intended functions. Those of ordinary skill will recognize that there are many suitable combinations of hardware and software that may be used for this purpose, which are either known in the art or may be developed in the future. For this reason, a figure showing physical hardware components and connections is not included herein.

As maybe seen in FIG. 3, the illustrated architecture 300 generally comprises hosting infrastructure 302, a virtualization layer 304 and an Application Platform Services layer 306. The hosting infrastructure 302 comprises physical hardware resources provided by the infrastructure on which the architecture 300 is being implemented. These physical hardware resources may include any or all of the processors 204, memory 206, network interfaces 208 and radio units 212 described above with reference to FIGS. 2A and 2B, and may also include traffic forwarding and routing hardware 308. The virtualization layer 304 presents an abstraction of the hardware resources 302 to the Application Platform Services layer 306. The specific details of this abstraction will depend on the requirements of the applications 220 being hosted by the Application Platform Services layer 306. Thus, for example, an APP 220 that provides traffic forwarding functions (for example as part of a User Plane Function, UPF) may be presented with an abstraction of the hardware resources 306 (e.g. processor(s) 204, memory 206 and traffic forwarding hardware 308) that simplifies the implementation of traffic forwarding policies. Similarly, an application that provides data storage functions may be presented with an abstraction of the hardware resources 306 (e.g. processor(s) 204 and memory 206) that facilitates the storage and retrieval of data (for example using Lightweight Directory Access Protocol, LDAP).

The application platform 306 provides the capabilities for hosting applications. In some embodiments, the application platform 306 supports a flexible and efficient multi-tenancy run-time and hosting environment for applications 220 by providing Infrastructure as a Service (IaaS) facilities. In operation, the application platform 306 may provide a security and resource "sandbox" for each application 220 being hosted by the platform 306. Each "sandbox" may be implemented as a Virtual Machine (VM) image 310 that may include an appropriate operating system and controlled access to (virtualized) hardware resources 302. The application platform 306 may also provide a set of middleware application services and infrastructure services to the applications 220 hosted on the application platform 306, as will be described in greater detail below.

Applications 220 from vendors, service providers, and third-parties may be deployed and executed within a respective Virtual Machine 310. For example, a Policy Control Function (PCF) may be implemented by means of one or more applications 220 hosted on the application platform 306 as described above. Communication between applications 220 and services of the application platform 306 may conveniently be designed according to the principles of Service-Oriented Architecture (SOA) known in the art.

Communication services 312 may allow applications 220 to communicate with the application platform 306 (through pre-defined Application Programming Interfaces (APIs) for example) and with each other (for example through a service-specific API).

A Service registry 314 may provide visibility of the services available on the server 300. In addition, the service registry 314 may present service availability (e.g. status of the service) together with the related interfaces and versions. This may be used by applications 220 to discover and locate the end-points for the services they require, and to publish their own service end-point for other applications to use.

Network Information Services (NIS) 316 may provide applications 220 with low-level network information pertaining to a network service instance or one or more PDU sessions, for example. For example, the information provided by NIS 316 may be used by an application 220 to calculate and present relevant data (such as: cell-ID, location of the subscriber, cell load and throughput guidance) to a Session Management Function (SMF), a Access and Mobility Function (AMF) and a Policy Control Function (PCF), any or all of which may themselves to implemented by applications 220 executing in respective VMs 310.

A Traffic Off-Load Function (TOF) service 318 may prioritize traffic, and route selected, policy-based, data streams to and from applications 220.

FIG. 4 illustrates an example of allocation of resource elements for transmission of Long Term Evolution (LTE) cell-specific common reference signal (CRS), for example between a base station 104 and a UE 106. In LTE, cell-specific CRSs are transmitted in all downlink subframes in a cell supporting Physical Downlink Shared Channel (PDSCH) transmission. They are transmitted on one or more of antenna ports 0 to 3. Cell-specific reference signals are defined for sub-carrier spacing $\Delta f=15$ Khz. Resource elements (k,l) used for transmission of cell-specific reference signals on any of the antenna ports in a slot will not be used for any transmission on any other antenna port in the same slot, and so are set to zero. FIG. 4 illustrates resource elements used for CRS transmission according to these definitions for the case of 2 antenna ports and normal cyclic prefix. Configurations for antenna ports 0-3 for the cases of normal and extended cyclic prefix can be found in Section 6.10.1, 3GPP TS36.211.

In New Radio (NR, which may also be referred to as 5G), the Demodulation Reference Signal (DMRS) resource elements are located within the resource blocks allocated for PDSCH transmission. They can be transmitted on multiple antenna ports separated by code division multiplexing (CDM) using length-2 orthogonal sequences in both the frequency and time domains, as well as on different frequency-domain resources (different CDM groups). The DMRS can either be mapped to a single symbol or to two adjacent symbols. When the DMRS configuration is based on adjacent symbols (which may also be referred to as double symbols) this enables the use of time domain CDM in addition to frequency domain CDM for port multiplexing, and thus doubles the number of available orthogonal ports. DMRS can be mapped to physical resources by frequency domain and time domain mapping options.

3GPP technical standard TS38.211 defines two different frequency domain mapping options, namely configuration type 1 or configuration type 2 as signaled by a higher layer parameter DMRS-Type. Configuration type 1 has a comb-based mapping pattern meaning that any DMRS port is mapped interleaved on every second subcarrier. Two antenna ports (e.g. ports 1000 and 1001) use even-numbered subcarriers in the frequency domain and are separated from each other with different length-2 orthogonal sequences in the frequency domain. Antenna ports 1000 and 1001 are said to belong to CDM group 0 as they use the same even numbered subcarriers. In a similar manner Antenna ports 1002 and 1003, for example, use odd-numbered subcarriers and are said to belong to CDM group 1. If more than 4 orthogonal ports are needed, double symbol DMRS is used with length-2 orthogonal sequences in the time domain. And up to 8 orthogonal ports (e.g. 1000-1007) can be supported using 2 CDM groups. Configuration type 1 is described in Table 7.4.1.1.2-1 of 3GPP TS38.211.

In configuration type 2, the motivation is to support a larger number of orthogonal reference signals. To enable this up to 3 CDM groups of length 2 OCC codes can be frequency division multiplexed thus enabling the use of 6 ports, 2 ports per CDM group for single symbol DMRS. Extending CDM to the time domain with double symbol DMRS, each CDM group can support 4 ports and hence 3 CDM groups can support 12 ports. Configuration type 2 is described in Table 7.4.1.1.2-2 of 3GPP TS38.211.

In 3GPP TS38.211, mapping types A and B are two main time domain structures differing in the location of the first DMRS symbol. In mapping type A, the first DMRS is in symbol 2 or 3 of the slot and the DMRS is mapped relative to the start of the slot boundary, regardless of where in the slot the actual data transmission starts. This is to locate the first DMRS symbol after the location of the PDCCH CORESET. In mapping type B, the first DMRS is in the first symbol of the data allocation, that is, the DMRS location is not given relative to the slot boundary but rather relative to where the data is located. This mapping is motivated to support low latency transmissions that will only use a fraction of the slot. Mapping types are described in Section 7.4.1.1.2 of 3GPP TS38.211.

FIG. 5A is an illustration of a single symbol (1+1) based DMRS in a type 1 configuration and type A mapping. This arrangement implements single symbol DMRS in two start positions l=2 and l=11, and support for up to four ports (e.g. ports 1000-1003).

FIG. 5B is an illustration of a double symbol (2+2) based DMRS in a type 1 configuration and type A mapping. This arrangement implements double symbol DMRS in two start positions l=2 and l=10, and support for up to eight ports (e.g. ports 1000-1007).

FIG. 6A is an illustration of a single symbol (1+1) based DMRS in a type 2 configuration and type A mapping. This arrangement implements single symbol DMRS in two start positions, l=2 and l=11, and support for up to six ports (e.g. ports 1000-1005).

FIG. 6B is an illustration of a double symbol (2+2) based DMRS in a type 2 configuration and type A mapping. This arrangement implements double symbol DMRS in two start positions l=2 and l=10, and support for up to 12 ports (e.g. ports 1000-1011).

Based on the NR DMRS description above, consider configuration type 1 with mapping type A and single symbol DMRS with start location $l_0=2$. The location of the DMRS symbols in time relative to the slot boundary for various symbol durations and additional DMRS positions based on Table 7.4.1.1.2-3 of 3GPP TS38.211 is illustrated in FIGS. 7A-7D.

For LTE/NR coexistence on shared spectrum, comparing the location of the LTE CRS symbol positions in FIG. 4 with the NR DMRS symbol positions in FIGS. 7A-7D, it may be seen that the LTE CRS on symbol l=4 of LTE slot 2 will collide with the NR DMRS on symbol l=11 for various symbol durations and additional DMRS positions as given in Table 1.

| Symbols relative to slot boundary | Number of DMRS symbols | DMRS-AdditionalPosition |
|---|---|---|
| 12 | Single | 1 + 3 |
| 13 | Single | 1 + 1, 1 + 2, 1 + 3 |
| 14 | Single | 1 + 1, 1 + 2, 1 + 3 |

Table 1 Single symbol NR DMRS, mapping type A collision conditions with LTE CRS

Corresponding LTE CRS and NR DMRS collision conditions for the 2 symbol DMRS are shown in Table 2, and may be derived from Table 7.4.1.1.2-3 of 3GPP TS38.211.

| Symbols relative to slot boundary | Number of DMRS symbols | DMRS-AdditionalPosition |
|---|---|---|
| 13 | Double | 2 + 2 |
| 14 | Double | 2 + 2 |

Table 2 Double symbol NR DMRS, type A mapping collision conditions with LTE CRS

Referring to Tables 1 and 2, the first column indicates the duration of symbols that cannot be transmitted if collision between LTE CRS and NR DMRS is to be avoided. This would mean that in order to use a 1+1 NR DMRS configuration, it would be necessary to use a symbol duration of 12 or less, which incurs a loss of at least 2 PDSCH symbols. This also holds for NR DMRS 1+2, while for NR DMRS 1+3 usable PDSCH symbols reduces to 11. Unusable PDSCH symbols imply a loss of both capacity and peak rate for NR, which is undesirable.

Systems and methods are disclosed herein that provide for mitigating the effects of LTE CRS and NR DMRS symbol collisions.

Some embodiments of the present invention implement a configuration type 1, PDSCH mapping type A, single symbol DMRS with one additional DMRS position (i.e. NR DMRS 1+1). As discussed above, there will be CRS and NR DMRS symbol collisions which may be handled using any one or more of the following techniques:

Technique 1: Selectively puncture LTE CRS symbols that overlap ND DMRS symbols. In this method, transmission of the LTE CRS symbols which overlap with NR DMRS symbols can be punctured and replaced with the NR DMRS symbol. In a scenario in which LTE and NR symbols are transmitted in respective different physical resource blocks (PRBs), all of the punctured LTE CRS symbol transmissions will be located within PRBs allocated for NR symbols. Under best case conditions, a conventional LTE UE receiver will experience minimal impact over all Signal to Noise Ratios (SNRs) when the LTE CRS at symbol 11 (that is, the $11^{th}$ symbol relative to the slot edge, where the count starts at 0) is punctured in PRBs allocated for NR transmission. Under worst case conditions, the LTE UE will experience a 50% drop in throughput for high SNR conditions (e.g. SNR>10 dB) when the LTE CRS at symbol 11 is punctured in all PRBs allocated to the LTE UE.

Technique 2: Implement a collision-aware NR UE receiver. A conventional NR UE receiver will fail to decode PDSCH completely when DMRS at symbol 11 is corrupted by collisions with LTE CRS. A collision aware NR UE receiver may compensate this decoding failure and reduce its impact on performance as compared to a conventional NR UE receiver.

Technique 3: Selectively reduce DMRS signaling to avoid overlap with LTE CRS symbols. In this solution, a single symbol DMRS pattern (such as in FIG. 7A) is used without any additional DMRS positions. This solution may be suitable for stationary or low mobility UEs. The Tracking Reference Signal (TRS) may be used to assist with doppler and delay spread computation used for channel estimation algorithms.

Technique 4: Selective puncturing of LTE CRS and/or NR DMRS based on channel measurements. In this solution, one of the LTE CRS and/or the NR DMRS transmissions is punctured based on the channel quality of the received DL signal at the LTE UE. For example, based on the estimated signal quality of the downlink signal, the eNB and gNB may puncture the LTE CRS if the estimated DL signal quality is below a threshold (TCRS), and otherwise puncture the NR DMRS in transmission to a collision aware NR UE receiver.

Each of these methods is described by way of example in the following detailed description.

Technique 1: Selectively Puncture LTE CRS symbols that overlap ND DMRS symbols

In LTE/NR shared spectrum transmission, CRS symbols on antenna ports 0 and 1 are punctured in symbol 11 of an NR slot or in symbol 4 of the 2nd slot in an LTE subframe. Puncturing is the operation where LTE CRS is not transmitted in those resource elements of the time frequency grid where the LTE CRS collides with NR DMRS. An example of the resource elements that are punctured is illustrated in the LTE time frequency grid of FIG. 8.

Figure 9:
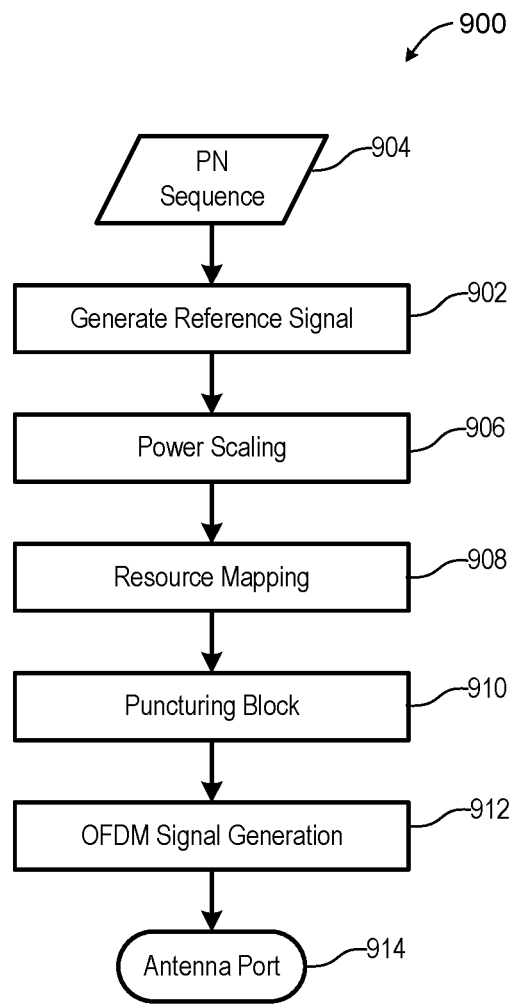
FIG. 9 is a flow-chart illustrating a selective puncturing method in accordance with example embodiments of the present invention.

FIG. 9 is a flow chart illustrating an example implementation of the puncturing operation. Referring to FIG. 9:

Step 1: An LTE reference signal sequence $r_{l,n_s}(m)$ is generated (at 902), for example based on a pseudo random length-31 gold sequence 904 as defined in Section 6.10.1.1 of 3GPP TS36.211. In this formulation, r(m) is the $m^{th}$ symbol in the reference sequence; l is the OFDM symbol number within the slot; and $n_s$ is the slot number within the radio frame.

Step 2: The LTE reference signals are scaled (at 906) by a gain factor G which is the required gain to ensure the signal does not exceed the radio maximum input digital power level per OFDM symbol.

$$y_{l,n_s}(m) = G r_{l,n_s}(m)$$

Step 3: The scaled reference signal sequence, $y_{l,n_s}(m)$ is mapped (at 908) to complex valued modulation symbols $a_{k,l}^{(p)}$ used as reference symbols for antenna port p in slot $n_s$, for example as defined in section 6.10.1.2 of 3GPP TS36.211.

Step 4: The complex valued modulation symbols $a_{k,l}^{(p)}$ are punctured (at 910) by setting selected symbol values (i.e. symbol values in PRBs that overlap NR DMRS symbols) to zero. For example, puncturing may be implemented as follows.

For odd numbered slots in a radio frame:

$$a_{k,l}^{(p)} = 0 \quad l = N_{symb}^{DL} - 3 \text{ if } p \in \{0,1\}$$

Figure 8:
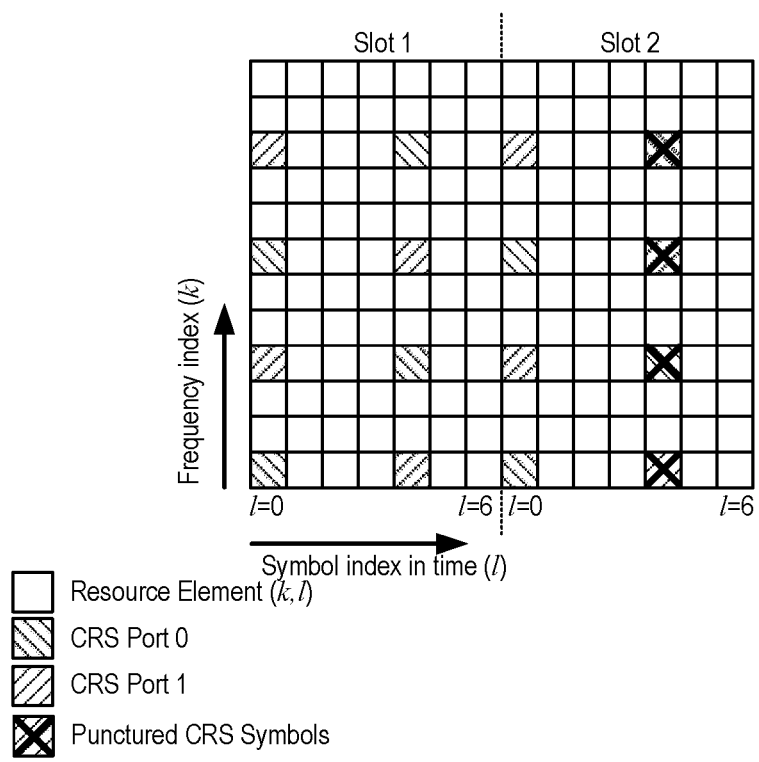
FIG. 8 illustrates selective puncturing of LTE CRS symbols transmission in accordance with example embodiments of the present invention.

Where:

$$k = 6m + (v + v_{shift}) \bmod 6$$

$$m = 0, 1, 2, \ldots, N_{RB}^{DL} - 1$$

$$v = 3 \text{ if } p = 0$$

$$v = 0 \text{ if } p = 1$$

$$v_{shift} = N_{ID}^{cell} \bmod 6$$

p=CRS port number
$N_{symb}^{DL}$=Number of OFDM symbols in a downlink slot
$N_{RB}^{DL}$=Downlink bandwidth configuration expressed in multiples of $N_{sc}^{RB}$
$N_{sc}^{RB}$=Resource block size in the frequency domain, expressed as a number of subcarriers
$N_{ID}^{cell}$=Physical cell ID This example process punctures CRS symbols at position l=4 of the second slot of the LTE frame, as may be seen in FIG. 8. As may be appreciated, puncturing these LTR CRS symbols avoids collision with NR DMRS symbols located at position l=11 of the NR frame (FIG. 5A).

Step 5: The punctured symbol sequence is then encoded (at 912) to generate an OFDM signal, which is supplied to an antenna port 914 for transmission.

By employing puncturing as described above, it is possible to use symbols 12 and 13 of an NR transmission slot during shared spectrum LTE/NR coexistence, with very low degradation of LTE transmission performance.

Technique 2: Collision Aware NR UE Receiver

In embodiments in which the LTE CRS signals are not punctured as described above, then every 3rd DMRS subcarrier at symbol 11 (symbol count at slot boundary starts at 0) of an NR transmission slot will be impacted (and thus corrupted) by a collision with the LTE CRS, which may result in a decoding failure in the NR UE receiver. The reason for this failure is that the receiver's NR decoding algorithms will make erroneous channel estimates due to the presence of corrupted DMRS symbols. In some embodiments of the present invention, this problem is addressed by to making the UE receiver aware of the colliding symbols. The enhanced (CRS-aware) UE can then take steps to modify the NR decoding algorithms accordingly. The following paragraphs describe changes to conventional NR UE receivers that may improve the UE decoding during LTE CRS/NR DMRS collisions. According to current NR specifications, a UE does not expect NR DMRS to collide with CRS (section 5.1.4 of 3GPP TS38.214), so proprietary gNB-UE agreements might be needed to make sure a UE "accepts" such collisions.

Figure 10:
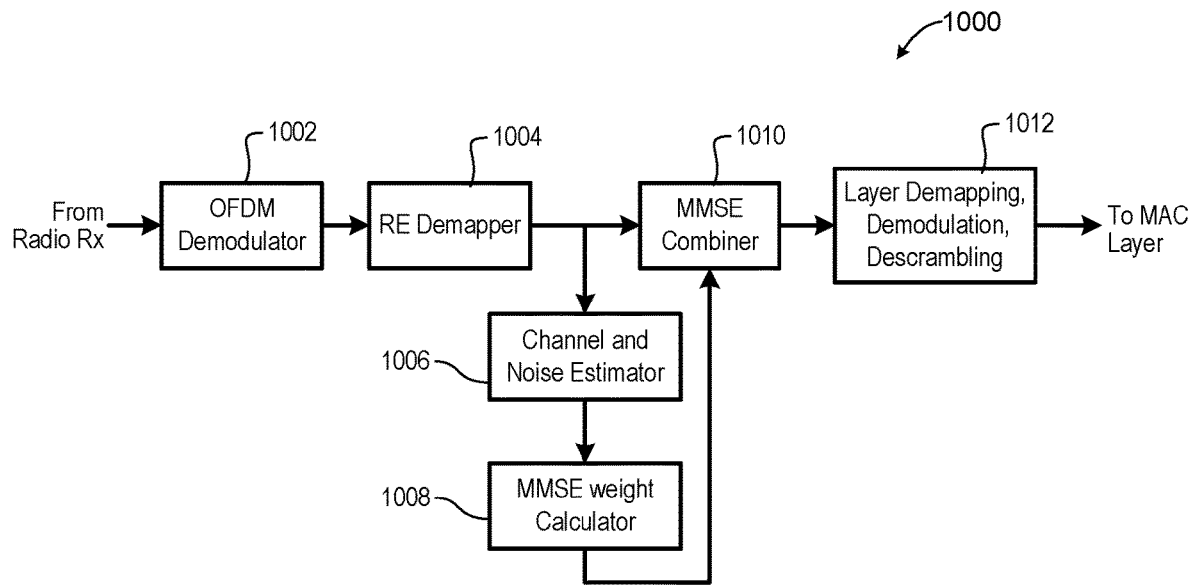
FIG. 10 is a block diagram schematically illustrating elements of a receiver.

FIG. 10 is a block diagram illustrating an example MMSE baseband receiver. An inbound signal from an RF receiver (not shown) is demodulated in an OFDM demodulator 1002 and converted to the frequency domain to generate a recovered resource grid. The recovered resource grid is then supplied to an RE Demapper 1004, which operates to extract reference signals and data from the recovered resource grid. The extracted reference signals are then supplied to a Channel and Noise Estimator 1006, which operates to calculate estimates of Channel parameters and noise, for example by comparing the extracted reference signals to known reference signal values stored in a memory. The density of the reference symbols in the time and frequency domains will depend up the configuration and mapping types as discussed above.

The channel and noise estimates are then supplied to an MMSE weight calculator 1008, which computes respective weights (or gains) to be applied to the received resource grid at each resource element. MMSE weight calculation may take into account the time and frequency characteristics of the channel as well as the noise characteristics. The calculated weights are supplied to an MMSE Combiner 1010 which operates to apply the calculated weights to the extracted reference signals from the RE Demapper 1004 to obtain a best estimate of each transmitted symbol.

Figure 11:
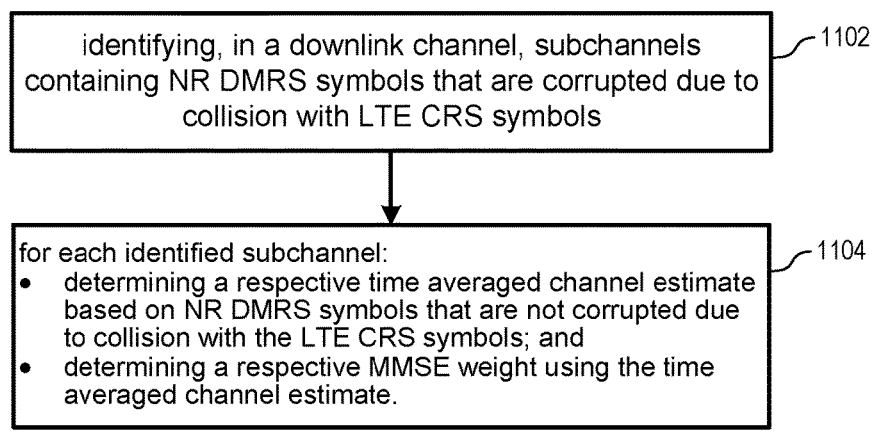
FIG. 11 is a flow-chart illustrating a method implemented in the receiver of FIG. 10 in accordance with example embodiments of the present invention.

The impact of the CRS/DMRS collisions in MMSE weight calculation is primarily due to the error in obtaining the channel estimates and the noise covariance. Accordingly, as may be seen in FIG. 11, the enhanced (collision aware) UE may be configured to implement a process that includes:

Step 1: identifying, in a downlink channel, subchannels containing NR DMRS symbols that are corrupted due to collision with LTE CRS symbols; and Step 2: for each identified subchannel:
determining a respective time averaged channel estimate based on NR DMRS symbols that are not corrupted due to collision with the LTE CRS symbols; and
determining a respective MMSE weight using the time averaged channel estimate.

In some embodiments, subchannels containing NR DMRS symbols that are corrupted due to collision with LTE CRS symbols may be identified based on CRS and DMRS configuration information received from the gNB. For example, the UE may receive (e.g. in Radio Resource Control, RRC, signaling) LTE CRS configuration information indicative of LTE CRS symbol positions. The UE may also receive (e.g. in RRC signaling) NR DMRS configuration information indicative of NR DMRS symbol positions, as described above. Based on the received configuration information, the UE can compare the LTE CRS symbol positions and the NR DMRS symbols symbol positions to obtain at least a sub-channel index of each subchannel in which at least one LTE CRS symbol has a same position as at least one NR DMRS symbol. MMSE weight calculation broadly consists of: Channel estimation; Noise covariance estimation; and Equalizer weight calculation. Each of these is discussed below.

Channel Estimation:

To recover the transmitted symbols, the channel between the base station antenna and the UE receiver antenna must be estimated and compensated for at the UE receiver. Channel estimation consists of the following steps:

Step 1: DMRS resource elements are extracted from the received resource grid as $Y_{RX,RS}(k,l_{RS})$, where $l_{RS}$ corresponds to the DMRS locations.

Step 2: A matched filter channel estimate $\hat{H}(k,l_{RS})$ is calculated by multiplying the received DMRS reference symbol in the frequency domain $Y_{RX,RS}(k,l_{RS})$ with the complex conjugate of the known transmitted DMRS sequence $X_{DMRS}(k,l_{RS})$.

$$\hat{H}(k,l_{RS}) = Y_{RX,RS}(k,l_{RS}) \cdot X_{DMRS}^*(k,l_{RS})$$

Figure 12:
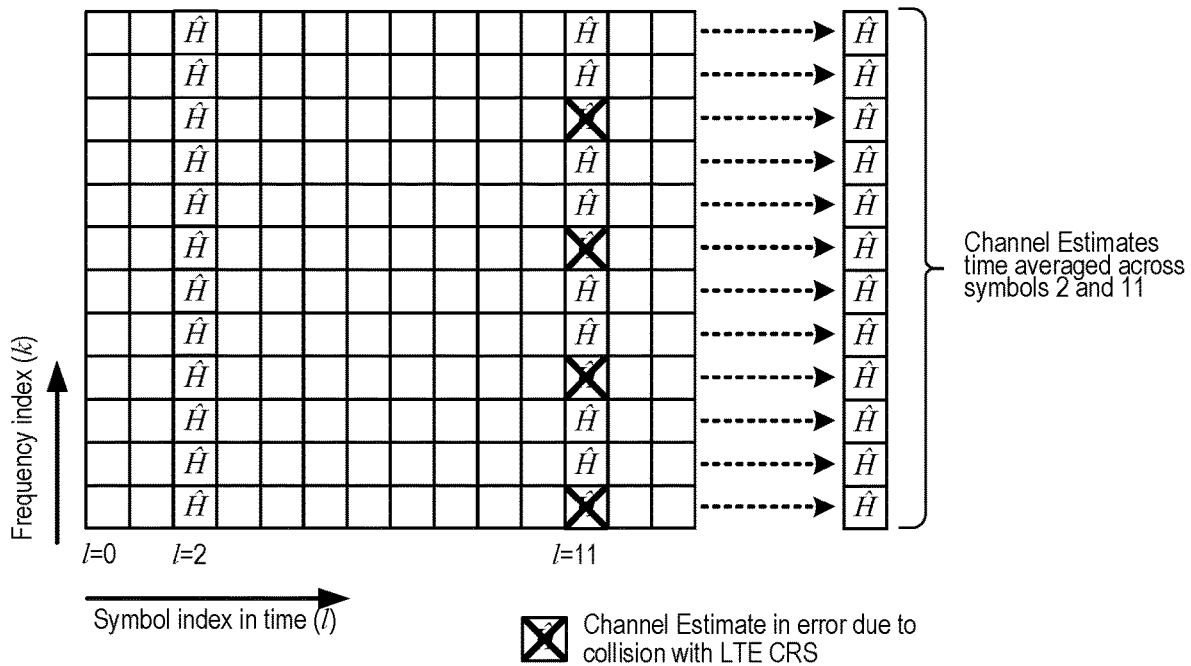
FIG. 12 illustrates errored channel estimates due to collisions.

Referring to the example in FIG. 12, for a DMRS 1+1 configuration in a shared spectrum scenario, the matched filter channel estimates at the symbol index $l_{RS}=11$ and subcarrier indices $k_{RS}=0, 3, 6, 9, \ldots$ will be in error due to collisions with LTE CRS symbols.

To compensate for this, an interpolation algorithm may be used to obtain the channel estimates at the $k_{RS}$ locations at symbol $l_{RS}=11$ such as the following $$\hat{H}(k_{RS},l_{RS}) = \frac{1}{2}(\hat{H}(k_{RS}-1,l_{RS}) + \hat{H}(k_{RS}+1,l_{RS}))$$

The matched filter channel estimates can then be time averaged across the DMRS symbols at $l_{RS}=2$ and $l_{RS}=11$ to obtain $\tilde{H}(k)$ as illustrated in FIG. 12.

The time averaged channel estimates $\tilde{H}(k)$ may then be converted to the discrete cosine transform (DCT) domain to eliminate the effect of noise outside the maximum channel delay. Use of the DCT results in a concentration of the designed signal energy to a small number of coefficients.

$$\hat{h}(m) = DCT\{\tilde{H}(k)\}$$

In the DCT domain, the optimal length of the channel estimates can be determined by estimating the noise for various lengths using any suitable optimization of minimization criteria. The result is an optimum channel estimate with reduced length given in the DCT domain as $\hat{h}_{opt}(m)$.

Channel estimates may be returned to the frequency domain by an inverse discrete cosine transform (IDCT) operation.

$$\tilde{H}(k) = IDCT\{\hat{h}_{opt}(k)\}$$

Noise Covariance Estimation:

The covariance matrix of the received interference and noise is required for the MMSE based equalizer weight calculation. Noise covariance estimation broadly includes: Signal variance estimation; Residual calculation; and Noise covariance estimation Signal variance estimation may be done over a covariance group. A covariance group could span multiple resource blocks. The available bandwidth is divided into several covariance groups, each indexed by $k_Q$. The number of subcarriers in each covariance group is given by $N_k^Q$, which is a multiple of $N_{SC}^{RB}$ the number of subcarriers in a resource block. The index of the first subcarrier in each covariance group $k_Q$ is given by $I_Q(k_Q)$. $N_{R_S}$ is the number of DMRS symbols, which for the case of 1+1 DMRS is 2. Based on the above definitions, the signal variance estimate $C(k_Q)$ of a covariance group $k_Q$ is given by:

$$C(k_Q) = \frac{1}{N_{R_S} N_k^Q} \left( \sum_{k=0}^{N_k^Q-1} |Y_{RX,RS}(I_Q(k_Q)+k, l_{RS})|^2 \Big|_{l_{RS}=2} + \sum_{k=0}^{N_k^Q-1} |Y_{RX,RS}(I_Q(k_Q)+k, l_{RS})|^2 \Big|_{l_{RS}=11} \right)$$

The second term in above equation is the variance across subcarriers at symbol 11, but due to collisions with LTE CRS, the signal values at the colliding sub carrier locations should be reset to zero to avoid errors in the computation of the total variance.

$$Y_{RX,RS}(I_Q(k_Q)+k, l_{RS}) = 0|_{l_{RS}=11, k=0,3,6,\ldots,N_k^Q-3}$$

With the above approximation, $C(k_Q)$ can be rewritten as $$C(k_Q) = \frac{1}{N_{R_S}} \left( \frac{1}{N_k^Q} \sum_{k=0}^{N_k^Q-1} |Y_{RX,RS}(I_Q(k_Q)+k, l_{RS})|^2 \Big|_{l_{RS}=2} + \frac{1}{\hat{N}_k^Q} \sum_{k=0}^{N_k^Q-1} |Y_{RX,RS}(I_Q(k_Q)+k, l_{RS})|^2 \Big|_{l_{RS}=11} \right)$$

where $\hat{N}_k^Q = N_k^Q - \frac{N_k^Q}{3}$, to account for the zeroing of the received symbols in the colliding sub carrier locations.

The residual signal is calculated by subtracting the product of the channel estimates and the known reference DMRS symbols from the received signal. The subtraction is carried out at the DMRS symbol locations $l_{RS}=2$ and $l_{RS}=11$.

$$E(k,l_{RS}) = Y_{RX,RS}(k,l_{RS}) - \tilde{H}(k) X_{DMRS}(k,l_{RS})|_{l_R=2,11}$$

Residual signal values at the colliding sub carrier locations will be in error. To correct for this, the residual signal is reset to zero at the colliding symbol and subcarrier locations.

$$E(k,l_{RS}) = 0|_{l_{RS}=11, k=0,3,6,\ldots,N_k^Q-3}$$

The noise covariance matrix is estimated from the residual signal and signal variance over each covariance group $k_Q$. For the DMRS 1+1 configuration, the noise covariance matrix is given by:

$$Q(k_Q) = \frac{1}{2N_k^Q} \sum_{l_{RS}=2,11} \sum_{k=0}^{N_k^Q-1} E(I_Q(k_Q)+k, l_{RS}) E(I_Q(k_Q)+k, l_{RS})^H + D(k_Q)^{-1}$$

where the regularization term $D(k_Q)$ is based on the received signal variance $C(k_Q)$ and is given by:

$$D(k_Q) = \begin{bmatrix} C(k_Q, 0) & \cdots & 0 \\ \vdots & \ddots & \vdots \\ 0 & \cdots & C(k_Q, N_r-1) \end{bmatrix} * 2^{-D_L}$$

$N_r$ is the number of receive antennas and $D_L$ is a regularization constant.

Furthermore $$E(I_Q(k_Q)+k, l_{RS}) = \begin{bmatrix} E(I_Q(k_Q)+k, l_{RS}, 0) \\ \vdots \\ E(I_Q(k_Q)+k, l_{RS}, N_r-1) \end{bmatrix}$$

Based on the above definitions, the MMSE equalizer weights can be calculated from the expression below:

$$W(k) = H(k)^H (H(k) H(k)^H + Q(I_{Q,k}(k)))^{-1}$$

where $I_{Q,k}(k)$ is the index of the covariance group for subcarrier k and H(k) for a single layer is given by:

$$H(k) = \begin{bmatrix} \tilde{H}(k, 0) \\ \vdots \\ \tilde{H}(k, N_r - 1) \end{bmatrix}$$

Note that the equalizer weight calculation will require an $N_r \times N_r$ matrix inversion per subcarrier.

The above changes to the channel estimation and equalization algorithms allows the use of symbols 12 and 13 in NR transmissions for the DMRS 1+1 configuration in LTE/NR shared spectrum. The same idea is also applicable to DMRS 1+2 and 1+3 configurations as in FIGS. 7C and 7D.

Figure 13:
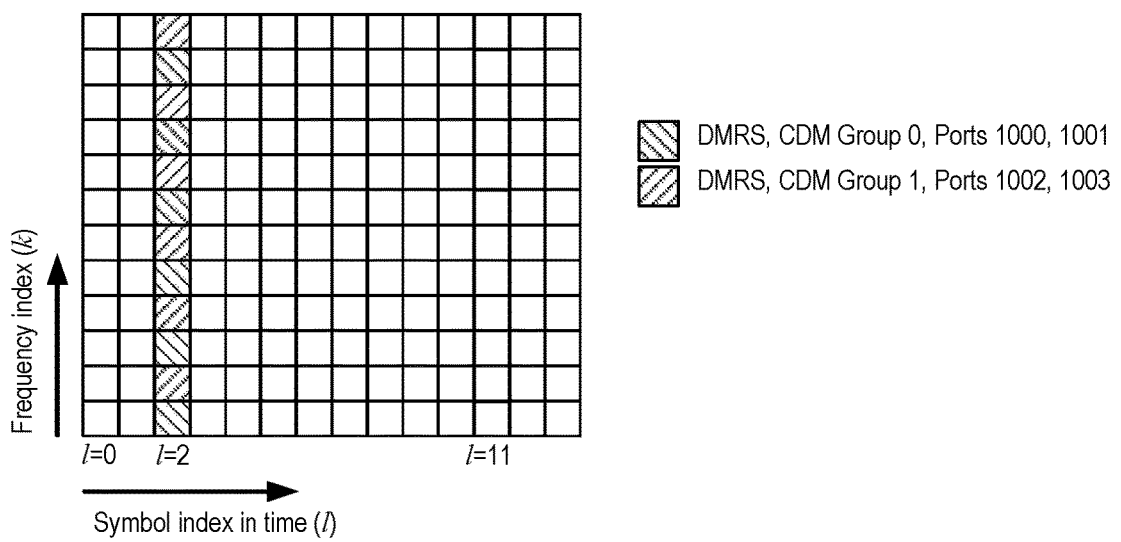
FIG. 13 illustrates a reduced NR DMRS configuration in accordance with example embodiments of the present invention.

Technique 3: Selectively Reducing NR DMRS Signaling to Avoid Overlap with LTE CRS Symbols This technique is to employ single symbol DMRS at position l=2 without an additional DMRS position (e.g. at l=11), as shown in FIG. 13. It is expected that this technique would work best for scenarios where the channel does not change frequently, as for the case of stationary or low mobility UEs, as there is a lack of reference signals in the time domain within a slot to capture rapid changes in the radio channel. The Tracking Reference Signal (TRS) may be used for doppler spread and delay spread estimation used in channel estimation algorithms.

Figure 14:
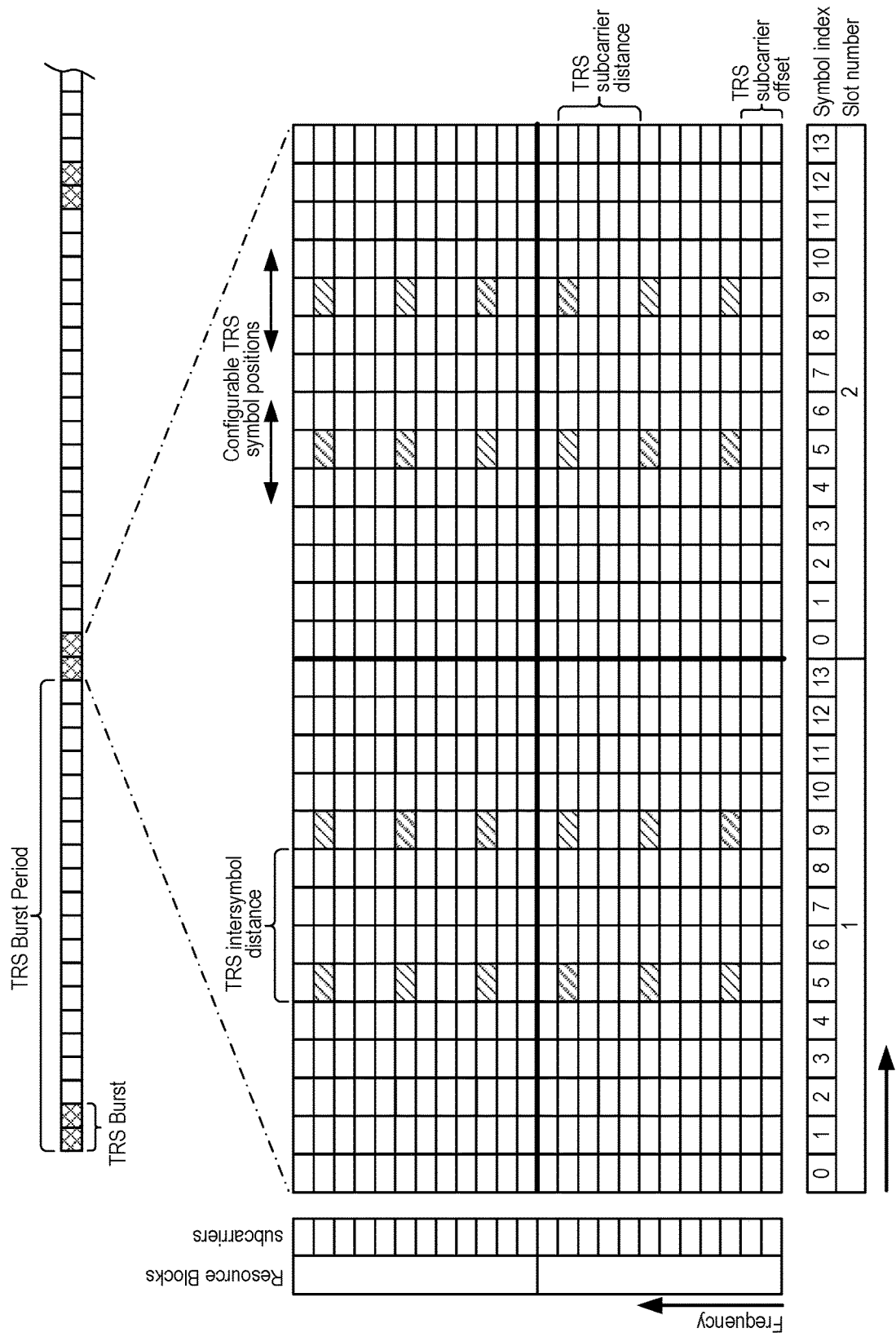
FIG. 14 illustrates an example TRS format usable in embodiments of the present invention.

TRS are sparse reference signals to assist the UE in time and frequency tracking. A specific CSI-RS configuration serves the purpose of a TRS. FIG. 14 illustrates an example TRS format. In the example of FIG. 14, the TRS may be transmitted in bursts of one or two slots with a periodicity of 10 ms, 20 ms, 40 ms or 80 ms. The TRS may be present in one or more OFDM symbols in each slot of the TRS burst. TRS symbols may be transmitted on selected subcarriers, which may be distributed (in the frequency domain) across each radio Resource Block at a selected TRS subcarrier distance. A selected TRS subcarrier offset may be used. FIG. 14 illustrates an example TRS format, in which two-slot TRS bursts are transmitted in each TRS period. Within each slot of the TRS burst, TRS symbols are transmitted in subcarriers 2, 6 and 10 (i.e. a TRS subcarrier distance of 4) at symbols 5 and 9 (i.e. a TRS intersymbol distance of 4). A TRS subcarrier offset of 2 is used in the example of FIG. 14. It will be appreciated that other TRS formats may be used.

The bandwidth of the TRS may correspond to the minimum of 52 resource blocks (RBs) or the UE bandwidth part (BWP). Due to the presence of the LTE DC subcarrier, LTE ZP CSI-RS can overlay NR TRS in only one half of the spectrum in an LTE NR shared spectrum scenario.

Technique 4: SNR Based LTE/DMRS Puncturing Selection

In this fourth technique, the eNB/gNB operates to select either LTE CRS puncturing or NR DMRS puncturing, based on DL channel metrics measured by the UE. For example, the eNB/gNB may receive DL channel quality information from the UE such as, for example, Signal to Noise Ratio (SNR), Signal to Noise and Interference Ratio (SNIR), received signal reference power (RSRP) and/or received signal reference quality (RSRQ) from the UE. Based on the information received from the UE, the eNB/gNB may calculate an estimate of the DL signal quality. If the estimated DL signal quality is below a predetermined threshold $T_{CRS}$, the eNB/gNB may elect to selectively puncture the LTE CRS as described above with reference to Technique 1. Otherwise, if the estimated DL signal quality is above the predetermined threshold $T_{CRS}$, and if the UE is collision aware (Technique 2 above), then the eNB/gNB may elect to selectively puncture the NR DMRS.

Those skilled in the art will recognize improvements and modifications to the embodiments of the present disclosure. All such improvements and modifications are considered within the scope of the concepts disclosed herein.

What is claimed is:

1. A method implemented in a network node, the method comprising any one or more of:
   selectively puncturing transmission of LTE CRS symbols that overlap NR DMRS symbols in a downlink transmission time interval;
   selectively puncturing transmission of NR DMRS symbols that overlap LTE CRS symbols in the downlink transmission time interval; and
   selectively reducing DMRS signaling to the UE to avoid overlap with LTE CRS symbols.

2. The method as claimed in claim 1, wherein the network node is configured to transmit LTE and NR symbols in respective different physical resource blocks, PRBs, and wherein selectively puncturing transmission of LTE CRS symbols that overlap NR DMRS symbols in a downlink transmission time interval comprises puncturing transmission of LTE CRS in PRBs allocated for NR symbols.

3. The method as claimed in claim 2, wherein puncturing transmission of LTE CRS in PRBs allocated for NR symbols comprises:
   generating (902) a reference signal sequence;
   mapping (908) the reference signal sequence to complex valued modulation symbols used as reference symbols; and
   puncturing (910) the complex valued modulation symbols by setting symbol values that overlap NR DMRS symbols to zero.

4. The method as claimed in claim 1, wherein selectively reducing DMRS signaling to avoid overlap with LTE CRS symbols comprises using a single symbol DMRS pattern without any additional DMRS positions.

5. The method as claimed in claim 4, further comprising transmitting a tracking reference signal.

6. A network node comprising processing circuitry configured to implement a method including any one or more of:
   selectively puncturing transmission of LTE CRS symbols that overlap NR DMRS symbols in a downlink transmission time interval;
   selectively puncturing transmission of NR DMRS symbols that overlap LTE CRS symbols in the downlink transmission time interval; and
   selectively reducing DMRS signaling to the UE to avoid overlap with LTE CRS symbols.

* * * * *